United States Patent
Radcliff

(10) Patent No.: US 10,444,042 B1
(45) Date of Patent: Oct. 15, 2019

(54) SYSTEMS AND METHODS FOR WIRELESSLY MONITORING A RECEPTACLE FOR A GUN

(71) Applicant: Jaime Radcliff, Des Moines, WA (US)

(72) Inventor: Jaime Radcliff, Des Moines, WA (US)

(73) Assignee: MVP GROUP, Seattle, WA (US)

(*) Notice: Subject to any disclaimer, the term of this patent is extended or adjusted under 35 U.S.C. 154(b) by 697 days.

(21) Appl. No.: 13/938,437

(22) Filed: Jul. 10, 2013

Related U.S. Application Data

(63) Continuation-in-part of application No. 12/359,796, filed on Jan. 26, 2009, now Pat. No. 9,915,559.

(60) Provisional application No. 61/023,806, filed on Jan. 25, 2008, provisional application No. 61/036,610, filed on Mar. 14, 2008, provisional application No. 61/045,053, filed on Apr. 15, 2008, provisional application No. 61/092,352, filed on Aug. 27, 2008.

(51) Int. Cl.
*G01D 7/00* (2006.01)
*G01J 1/42* (2006.01)
*G08B 21/18* (2006.01)

(52) U.S. Cl.
CPC .................. *G01D 7/00* (2013.01); *G01J 1/42* (2013.01); *G08B 21/18* (2013.01)

(58) Field of Classification Search
None
See application file for complete search history.

(56) References Cited

U.S. PATENT DOCUMENTS

| | | | | |
|---|---|---|---|---|
| 4,267,553 A | * | 5/1981 | Vogelsanger | A45C 13/24 340/514 |
| 5,108,019 A | * | 4/1992 | Woodward | F41C 33/0227 224/243 |
| 5,416,472 A | * | 5/1995 | Torii, Jr. | A47B 81/005 211/64 |
| 5,417,000 A | * | 5/1995 | Chen | F41A 17/54 42/70.06 |
| 5,479,149 A | * | 12/1995 | Pike | F41C 33/0209 340/539.1 |
| 5,525,966 A | * | 6/1996 | Parish | F41C 33/0227 224/243 |
| 5,546,124 A | * | 8/1996 | Scerbo, III | F41C 33/0227 224/911 |
| 5,598,151 A | * | 1/1997 | Torii, Jr. | A47B 81/005 340/5.33 |
| 5,779,114 A | * | 7/1998 | Owens | F41C 33/0209 224/193 |
| 5,828,301 A | * | 10/1998 | Sanchez | F41C 33/029 224/244 |
| 5,996,865 A | * | 12/1999 | Bissey | B60R 7/043 206/37 |

(Continued)

*Primary Examiner* — Curtis J King
(74) *Attorney, Agent, or Firm* — Peloquin, PLLC; Mark S. Peloquin, Esq.

(57) ABSTRACT

Methods and apparatuses are described to monitor a removable object. An apparatus includes a receptacle; the receptacle is configured to contain the removable object. A sensor node, the sensor node is associated with a unique identifier. The sensor node is configured to sense the presence of the removable object within the receptacle and to transmit a signal containing the unique identifier to a remote device. The signal is related to the presence of the removable object. A notification is sent to an entity which is responsive to the signal and a notification profile which is related to the receptacle.

25 Claims, 15 Drawing Sheets

(56) References Cited

U.S. PATENT DOCUMENTS

| | | | | |
|---|---|---|---|---|
| 6,260,300 B1* | 7/2001 | Klebes | F41A 17/066 | 206/317 |
| 6,363,223 B1* | 3/2002 | Gordon | F41A 33/00 | 348/61 |
| 6,400,269 B1* | 6/2002 | Savastano | F41C 33/06 | 340/506 |
| 6,568,116 B2* | 5/2003 | Hathaway | F41A 17/06 | 211/64 |
| 6,695,207 B1* | 2/2004 | Norris, Jr. | B60R 25/23 | 235/380 |
| 6,791,451 B1* | 9/2004 | Muise | G08B 25/10 | 340/10.1 |
| 6,831,556 B1* | 12/2004 | Boykin | H04N 7/181 | 340/539.1 |
| 6,995,671 B2* | 2/2006 | Dutta | A47G 29/1214 | 232/17 |
| 7,158,167 B1* | 1/2007 | Yerazunis | H04N 5/907 | 348/61 |
| 7,200,965 B2* | 4/2007 | Vor Keller | E05B 47/0603 | 224/244 |
| 7,236,085 B1* | 6/2007 | Aronson | E05B 45/005 | 109/45 |
| 9,007,170 B2* | 4/2015 | Wall | E05G 1/024 | 206/317 |
| 2002/0032976 A1* | 3/2002 | Riener | F41A 17/063 | 42/70.11 |
| 2002/0135477 A1* | 9/2002 | Dabrowski | F41A 17/04 | 340/542 |
| 2004/0066275 A1* | 4/2004 | Mickler | F41C 33/06 | 340/5.33 |
| 2005/0066567 A1* | 3/2005 | Newkirk | F41A 17/06 | 42/70.11 |
| 2006/0082730 A1* | 4/2006 | Franks | F41A 17/06 | 352/95 |
| 2006/0098088 A1* | 5/2006 | Raghunath | H04N 5/782 | 348/61 |
| 2006/0208857 A1* | 9/2006 | Wong | F41C 33/0209 | 340/5.82 |
| 2006/0290492 A1* | 12/2006 | Jidas | F41C 33/06 | 340/545.6 |
| 2007/0013478 A1* | 1/2007 | Crigger | A47B 81/005 | 340/5.53 |
| 2008/0061991 A1* | 3/2008 | Urban | F41C 33/0209 | 340/573.1 |
| 2008/0204231 A1* | 8/2008 | Hietanen | F41A 17/063 | 340/568.1 |
| 2010/0315235 A1* | 12/2010 | Adegoke | G01S 19/16 | 340/568.1 |
| 2011/0079170 A1* | 4/2011 | Al-Mutairi | E05G 1/06 | 109/23 |
| 2013/0318847 A1* | 12/2013 | Kelly | F41C 17/46 | 42/70.06 |
| 2014/0038668 A1* | 2/2014 | Vasavada | H04L 65/4061 | 455/556.1 |
| 2014/0083338 A1* | 3/2014 | Mcalexander | E05G 1/02 | 109/52 |
| 2014/0284232 A1* | 9/2014 | Feris | F41C 33/06 | 206/317 |
| 2015/0256990 A1* | 9/2015 | Vilrokx | H04W 76/007 | 455/404.1 |
| 2015/0332528 A1* | 11/2015 | McGinnis | E05B 65/0075 | 109/38 |
| 2015/0332604 A1* | 11/2015 | Rich | F41A 33/00 | 434/219 |
| 2015/0369559 A1* | 12/2015 | Del Rosario | F41C 33/029 | 340/686.4 |
| 2016/0018194 A1* | 1/2016 | Childs | F41H 9/10 | 222/173 |

* cited by examiner

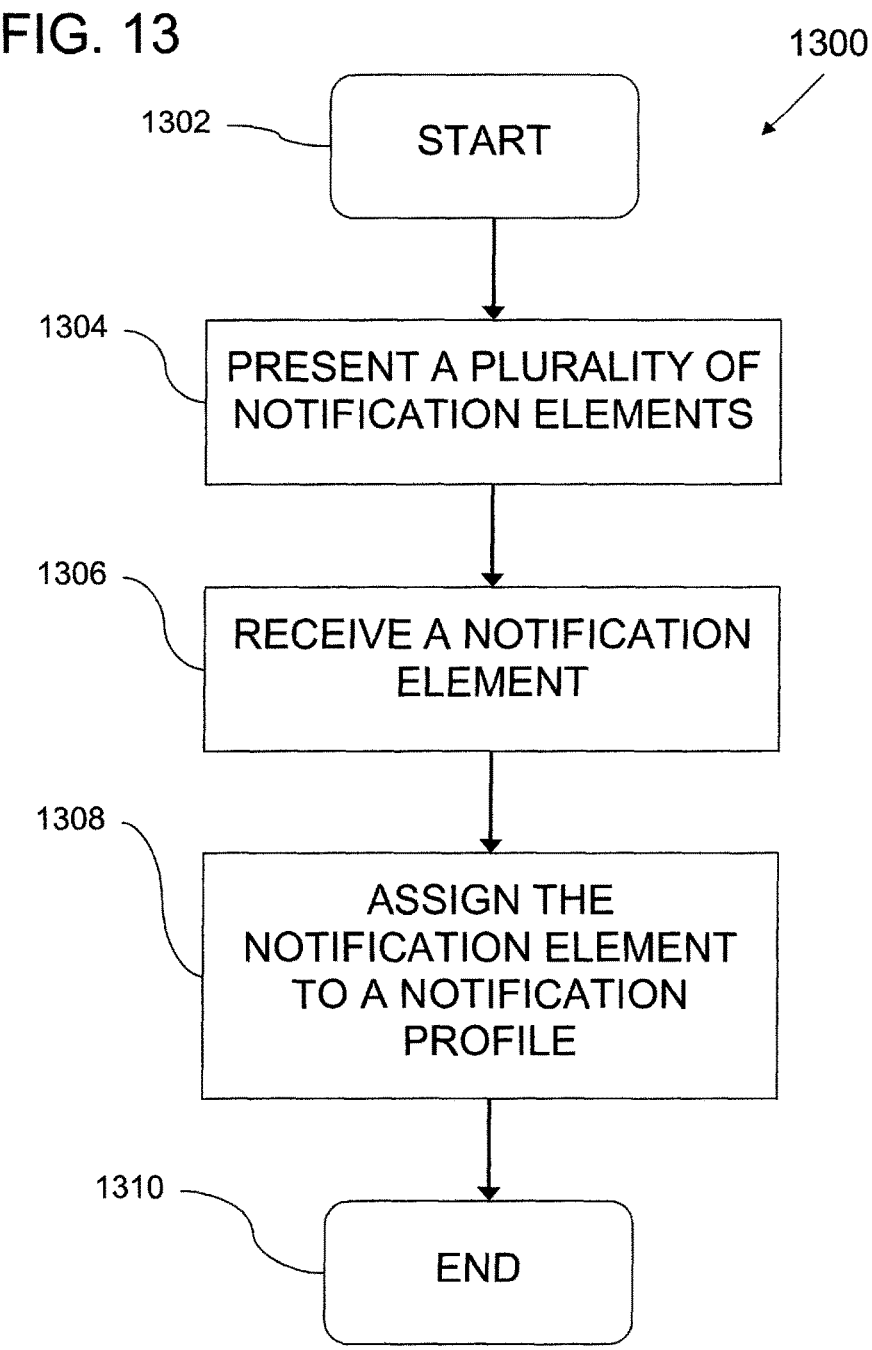

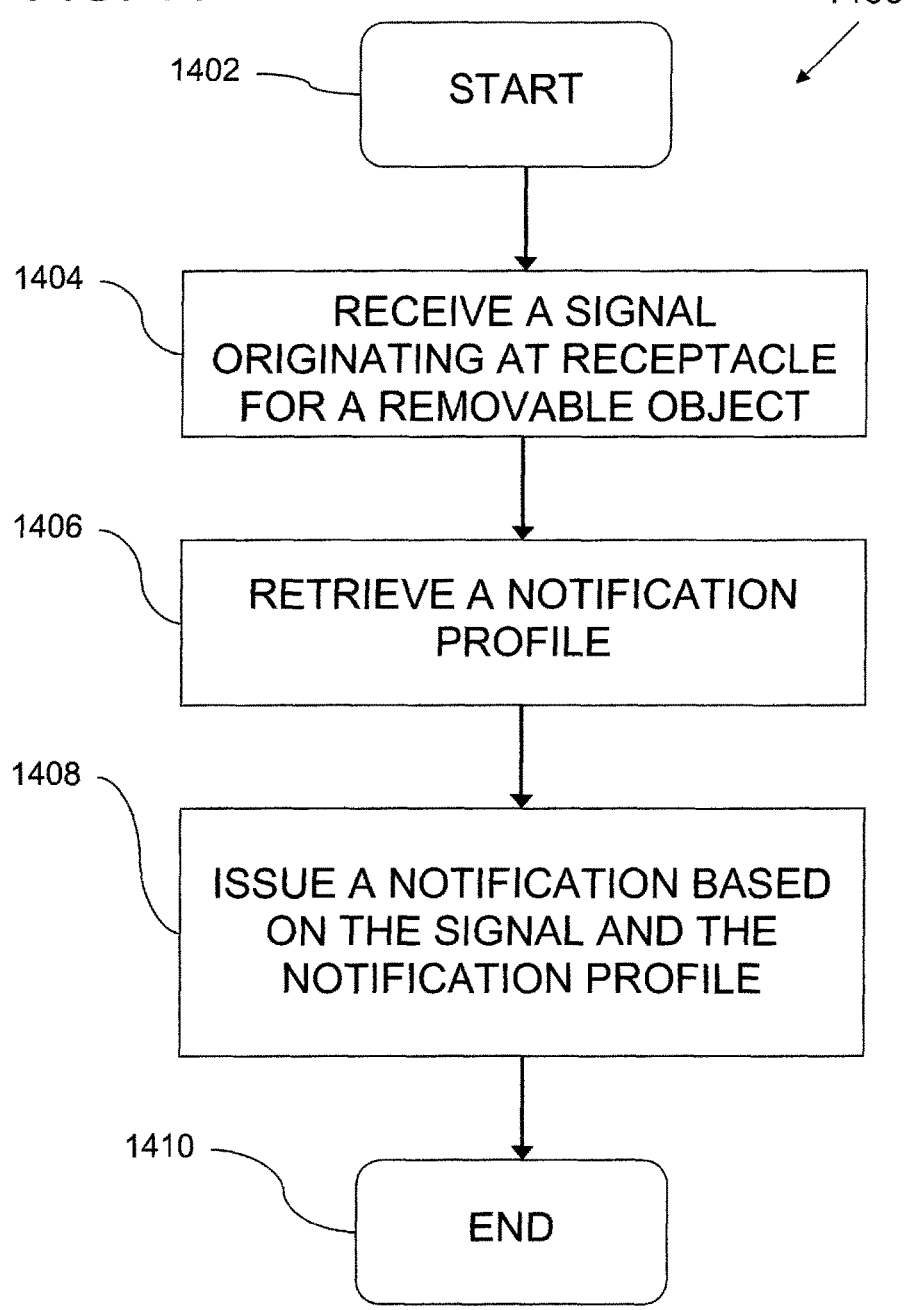

SYSTEMS AND METHODS FOR WIRELESSLY MONITORING A RECEPTACLE FOR A GUN

RELATED APPLICATIONS

This application is a continuation-in-part of U.S. patent application Ser. No. 12/359,796 filed on Jan. 26, 2009.

This application claims the benefit of U.S. provisional patent application Ser. No. 61/023,806 filed Jan. 25, 2008; U.S. provisional patent application Ser. No. 61/036,610 filed Mar. 14, 2008; U.S. provisional patent application Ser. No. 61/045,053 filed Apr. 15, 2008 and U.S. provisional patent application Ser. No. 61/092,352 filed Aug. 27, 2008. The foregoing applications are incorporated by reference in their entirety as if fully set forth herein.

BACKGROUND OF THE INVENTION

1. Field of Invention

The invention relates generally to monitoring a removable object in a receptacle, and more specifically to apparatuses and methods used to monitor a receptacle for a gun.

2. Art Background

Guns and ammunition are used in a variety of settings from a private personal se setting to a club setting in the context of a shooting range, to a law enforcement setting of a municipal police department to a military setting in a theater of war or national defense.

Regardless of the setting employed for use of a gun/or ammunition safety measures are employed in order to restrict access to the gun or ammunition or to disable the gun so that it cannot fire. A safety mechanism is a well known device that is used to disable a gun so that it cannot fire. During use, a safety is moved to an off position in order to enable the gun to fire. A safety mechanism does not distinguish between an authorized user of the gun and an unauthorized user of the gun. This can present a problem since guns have been stolen, misappropriated, etc. by unauthorized users and then used to commit crimes or have been accidentally discharged by children for example, thereby causing injury.

Another level of security which is used in relation to guns and ammunition is a locked storage container. A locked storage container presents a degree of a barrier to access of a gun/or ammunition, however a locked storage container can be forced opened or stolen by unauthorized people, and then the gun and/or ammunition contained therein can be used to commit a crime or crimes, this can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 13 illustrates a method for establishing a notification profile according to embodiments of the invention; and FIG. 14 illustrates a method for executing a notification profile according to embodiments of the invention.

APPENDIX A includes manufacturing details for a system for wirelessly monitoring a brochure box having a sensor, in accordance with an embodiment of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described for monitoring a receptacle and/or a removable object in a receptacle. Specific details of certain embodiments of the invention are set forth in the following description and in FIGS. 1-14 and APPENDIX A to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
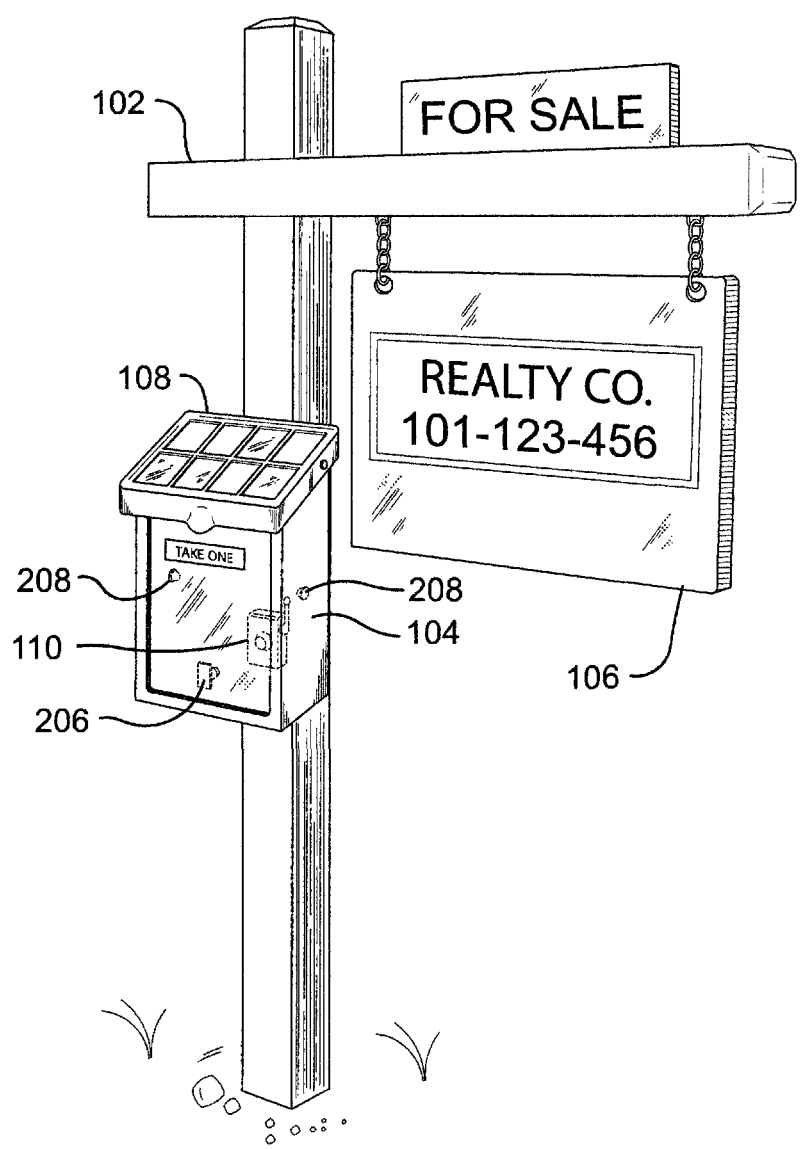
FIG. 1 is a perspective view of a brochure box having a sensor fastened to a sign holder, in accordance with an embodiment of the invention.

FIG. 1 is a perspective view of a brochure box having a sensor fastened to a sign holder, in accordance with an embodiment of the invention. In one embodiment, system 100 includes a sign holder 102, a brochure box 104, a sign 106, a lid 108, and a sensor node 110. The sign holder 102 suspends the sign 106 for display. The brochure box 104 is configurable to receive and dispense brochures (FIG. 4a) and is fastened to the sign holder 102. The brochure box 104 includes the sensor node 110 and the lid 108, which is configurable to open and close to facilitate receiving and dispensing brochures. The sensor node 110 is operable to sense whether there is a presence or absence of brochures and communicate such information to an entity, such as an individual, group, organization, or business, tasked with replenishing the brochures (FIG. 5). Accordingly, system 100 is usable in a real estate sales environment whereby the sign holder 102 is disposed proximate to a home for sale and the sign 106 is a 'for sale' sign. The brochure box 104 is configurable to receive and dispense brochures providing information and pictures relating to the home for sale. The sensor node 110 determines when the brochures within the brochure box 104 are low or exhausted and communicates such to an entity tasked with replenishing the brochures, such as a real estate agent or broker.

In various other embodiments, the sign holder 102 or the sign 106 are omitted and only the brochure box 104 is provided. Alternatively, the brochure box 104 can be mounted differently, such as on a support stand, to a post, or to a building. Further, the brochure box 104 and the sign holder 102 can be integrated into a single component. Additionally, the brochure box 104 or the sign holder 102 can be constructed from plastic, wood, concrete, or some other material. In an alternate embodiment, the sensor node 110 is disposed differently relative to the brochure box 104 or on the sign holder 102. In further embodiments, system 100 is usable in different environments such as within educational institutions, on message boards, in business lobbies, or anywhere else where brochures are dispensed. In alternative embodiments, the brochure box 104 is a mail box, a post office box, a drop box, vending machine, or any other receptacle whereby documents, mail, packages, or other objects are deposited for pickup. In these embodiments, the sensor node 110 is operable to sense the presence of documents, mail, packages, or other objects and communicate such information to an entity tasked with retrieving the same (FIG. 5). Thus, the brochure box 104 in these embodiments is configurable to receive documents, mail, packages, or other objects and the sensor node 110 is configurable to determine when documents, mail, packages, or other objects are present to communicate such to an entity having an interest in retrieving the documents, mail, packages, or other objects. In other embodiments, the sensor node 110 is replaced or supplemented with an input device such as a mechanical or electrical button, switch, motion sensor, or other similar device. The input device is positionable proximate to or within the brochure box 104. Thus, upon brochures being low or exhausted or upon documents, mail, packages, or other objects being present, the input device is triggered, such as by pushing the button, flipping the switch, or through motion, to communicate such to an entity having an interest in replenishing or retrieving the same.

In one particular embodiment, the brochure box 104 includes a locking mechanism.

Figure 2:
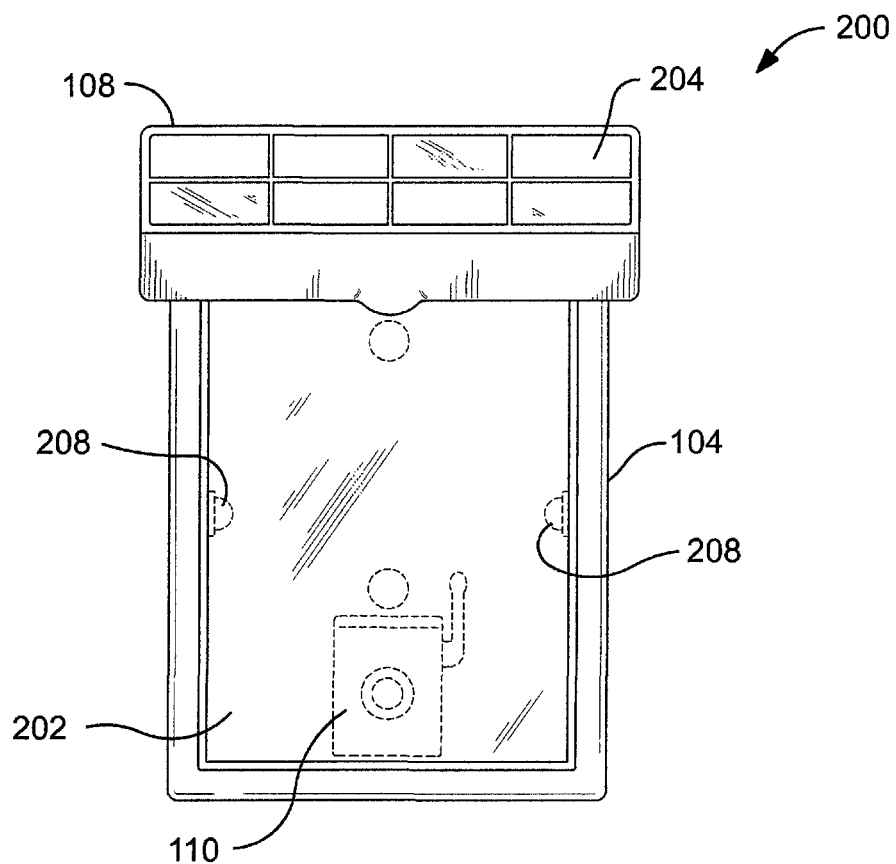
FIG. 2 is a front elevational view of a brochure box having a sensor, in accordance with an embodiment of the invention.

FIG. 2 is a front elevational view of a brochure box having a sensor, in accordance with an embodiment of the invention. In one embodiment, system 200 includes the brochure box 104, the lid 108, the sensor node 110, front panel 202, and solar panels 204, and an infrared light source 206. The brochure box 104 defines a cavity for receiving and dispensing brochures (FIG. 4). The front panel 202 is at least partially transparent to permit viewing of any brochures disposed within the brochure box 104. The lid 108 removably covers the brochure box 104 to protect brochures contained therein and contains the solar panels 204. The brochure box 104 is composed of plastic, aluminum, steel, concrete or a combination of the foregoing. The sensor node 110 is fastened to the brochure box 104 opposite to the front panel 202 and includes an optical sensor for sensing infrared light, a processor, a wireless communication modem, and a power source. The infrared light source 206 is disposed opposite to the sensor node 110 and is configurable to transmit infrared light towards the optical sensor. In certain embodiments, the infrared light source 206 conserves energy by only periodically transmitting infrared light and the sensor node 110 conserves energy by only periodically sampling for infrared light. The transmission and sampling can be synchronized. When brochures are present, the infrared light from the infrared light source 206 is blocked from reaching the optical sensor. However, when brochures are not present, the infrared light from the infrared light source 206 is received by the optical sensor. When the optical sensor receives the infrared light, the processor instructs the wireless communication modem to send a communication signal containing a unique identifier to a base station (FIG. 5). The wireless communication modem uses cellular, satellite, wireless LAN, or other similar technology to send the communication signal. An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. Alternatively, the infrared light source 206 is disposed adjacent to, proximate to, or part of the sensor node 110 and is configurable to transmit infrared light away from the optical sensor. In certain embodiments, the infrared light source 206 conserves energy by only periodically transmitting infrared light and the sensor node 110 conserves energy by only periodically sampling for infrared light. The transmission and sampling can be synchronized. When brochures are present, the infrared light from the infrared light source 206 is at least partially reflected by the brochures back upon the optical sensor. However, when brochures are not present, the infrared light from the infrared light source 206 is not reflected back upon the optical sensor. Thus, when the optical sensor does not receive the infrared light, the processor instructs the wireless communication modem to send a communication signal containing a unique identifier to abase station (FIG. 5). The wireless communication modem uses cellular, satellite, wireless LAN, or other similar technology to send the communication signal. An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. The solar panels 204 convert solar energy into electrical energy and act as the power source to the sensor node 110 or the infrared light source 206.

In alternative embodiments, the brochure box 104 and the front panel 202 are differently shaped. In another embodiment, the front panel 202 is omitted, only partially transparent, or opaque. In a further embodiment, the lid 108 is omitted or differently configured. In one particular embodiment, the brochure box 104 is a mail box, a post office box, a drop box, vending machine, or any other receptacle whereby documents, mail, packages, or other objects are deposited for pickup and the sensor node 110 is usable in coordination with the same to remotely sense the presence of documents, mail, packages, or other objects. In an alternate embodiment, the lid 108 is spring biased to a closed position over the brochure box 104. In yet another embodiment, the solar panels 204 are differently disposed, such as on the brochure box 104, on a separate extension device, or on another structure. In an additional embodiment, the sensor node 110 is differently disposed, such as on the lid 108, a side of the brochure box 104, outside the brochure box 104, on the front panel 202, or separate from the brochure box 104. In an alternate embodiment, a plurality optical sensors or infrared light sources 206 are provided for redundancy. In yet a further embodiment, the wireless communication modem is replaced or substituted with a wire-based communication modem or network card. In a further embodiment, the solar panels 204 are replaced or supplemented with one or more batteries or a wall outlet, which can act as the power source to the sensor node 110 or the infrared light source 206.

In one particular embodiment, the brochure box 104 includes one or more lights 208, such as LED lights, to illuminate the brochure box 104 and any brochures contained therein; the solar panels 204 can also act as the power source to the lights 208. In further embodiments, the brochure box 104 includes an RFID sensor to deter theft or assist in recovery. In various embodiments, the RFID sensor is located at the sensor node 110. In an additional embodiment, the brochure box 104 includes a GPS tracking device. In various embodiments, the GPS tracking device is located at the sensor node 110. Upon movement of the brochure box 104, such as when the brochure box is stolen, the processor is configurable to instruct the wireless communication modem to send a communication signal to a base station indicating possible theft of the brochure box 104. The GPS tracking device can continue to provide details of the location of the brochure box 104 to assist in recovering the brochure box 104. In a further embodiment, tampering with the GPS tracking device renders the sensor node 110 inoperable. In yet another embodiment, the brochure box 104 includes a voice system that provides audible messages in response to the presence of individuals or the removal of a brochure from the brochure box 104. Such audible messages can include "welcome", "please take a brochure", "thank you for taking a flier", details from the brochure or about a house for sale, or other similar or customized messages. In various embodiments, the voice system, which can include a microphone and a speaker, is located at the sensor node 110.

In an alternative embodiment, the sensor node 110 is configurable to sample any of ambient light, other light, displacement, pressure, heat, movement, impression, position, weight, density, mass, magnetic flux, other attribute, or a combination of the same. For instance, in one particular embodiment, the sensor node 110 is configurable to sample ambient light levels in the brochure box 104 and the processor compares the sampled ambient light levels with a predetermined threshold value or range of values. When the sampled ambient light levels are greater than the predetermined threshold value or outside a range of values, such as would occur when the brochure box 104 contains no brochures, the processor instructs the wireless communication modem to send a communication signal containing a unique identifier to a base station (FIG. 5). An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. In another particular embodiment, the sensor node 110 is configurable to sample the weight of brochures within the brochure box 104, such as using a pressure plate or pressure resistant coils. The processor compares the sampled weight values with a predetermined threshold value or range of values. When the weight is below the threshold value or outside the minimum and maximum weight distribution values, indicating the absence of brochures, the processor instructs the wireless communication modem to send a communication signal containing a unique identifier to a base station (FIG. 5). In one particular embodiment, when the weight is greater than the maximum weight distribution value, indicating too many brochures or excessive force, the processor instructs the wireless communication modem to send a communication signal to a base station indicating that there is tampering or some other problem. Similarly, the sensor node 110 can be configurable to sample displacement or position and the processor compares the sampled displacement or position value with the predetermined threshold value or the range of values. In yet a further embodiment, the sensor node 110 is supplemented or replaced by an input device such as an electronic or mechanical button, switch, audible sensor, motion sensor, or other similar device. Indeed, the sensor node 110 can include any sensor or input device.

Figure 3:
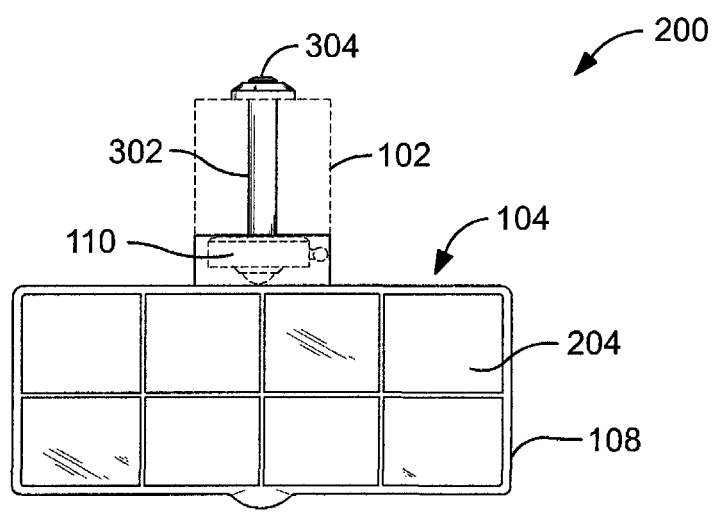
FIG. 3 is a top plan view of a brochure box having a sensor fastened to a sign holder, in accordance with an embodiment of the invention;\

FIG. 3 is a top plan view of a brochure box having a sensor fastened to a sign holder, in accordance with an embodiment of the invention. In one embodiment, system 200 includes the brochure box 104, the lid 108, the solar panels 204, the sensor node 110, a post 302, a lock 304, and the sign holder 102. The lid 108 is movably mounted to the brochure box 104 to protect the brochure box 104 contents and the lid 108 includes the solar panels 204 disposed on its surface. The solar panels 204 are configurable to receive and convert solar energy from the sun into electrical energy as a power source for the sensor node 110 or the infrared light source 206. The sensor node 110 is mounted within the brochure box 110 opposite the front panel 202 (FIG. 2) and is configurable to sense infrared light from the infrared light source 206. The at least one post 302 extends approximately perpendicularly from a rear of the brochure box 104 and is configurable to being slidably received through an aperture in the sign holder 102. With the at least one post 302 inserted through the sign holder 102, the lock 304 is removably securable to the post 302 to prevent unintended removal or theft of the brochure box 104.

In another embodiment, the solar panels 204 are differently positioned relative to the brochure box 104 or the lid 108, are contained on an extension device, disposed on another structure, or are replaced or supplemented with an alternative power source. In a further embodiment, the sensor node 110 is differently mounted relative to the brochure box 110 or the lid 108; for example, the sensor node can be mounted on a side of the brochure box 110, on the front panel 202, outside the brochure box 110, on the lid 108, on an extension device, or can be disposed on another structure. In an alternative embodiment, the at least one post 302 or the lock 304 are omitted, replaced, or supplemented with an alternative structure, such as a loop, a chain, a magnet, or some other fastening device. The at least one post 302 can differently extend from the brochure box 110, such as from a side of the brochure box 110, from the front panel 202, or from the lid 108, and can differently couple to the sign holder 102, such as around the sign holder 102. Alternatively, the brochure box 104 can be integrated with the sign holder 102.

Figure 4A:
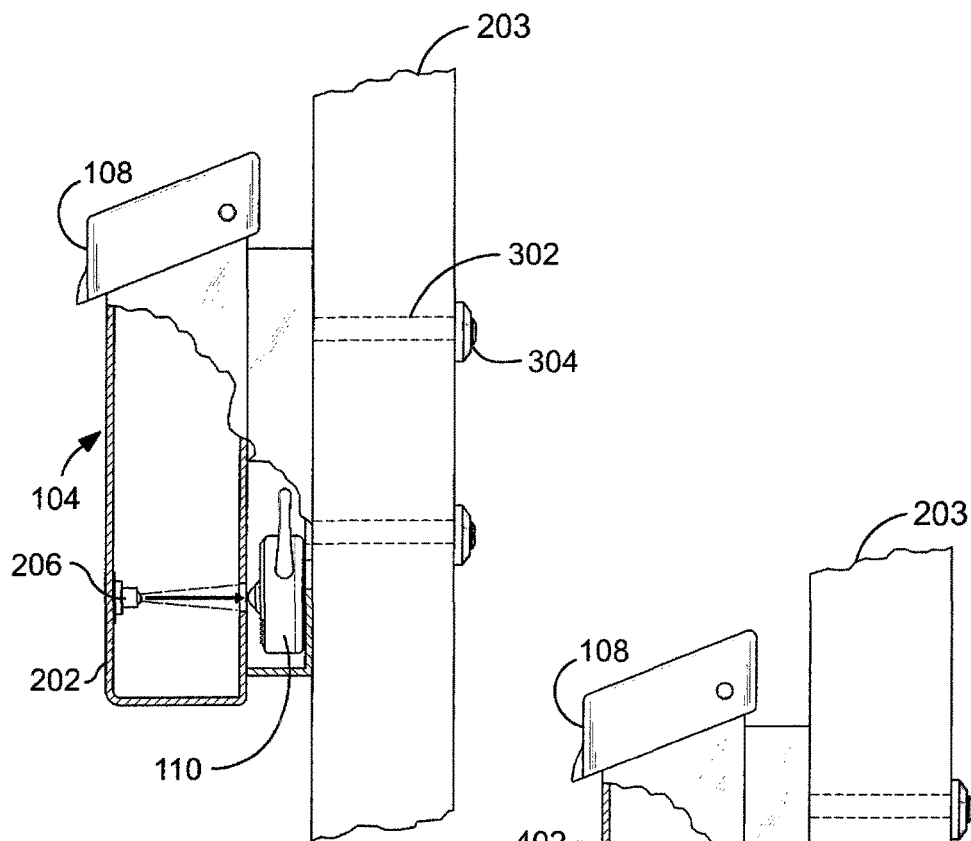
FIGS. 4a and 4b are side elevational views of a brochure box having a sensor fastened to a sign holder, in accordance with an embodiment of the invention.
Figure 4B:
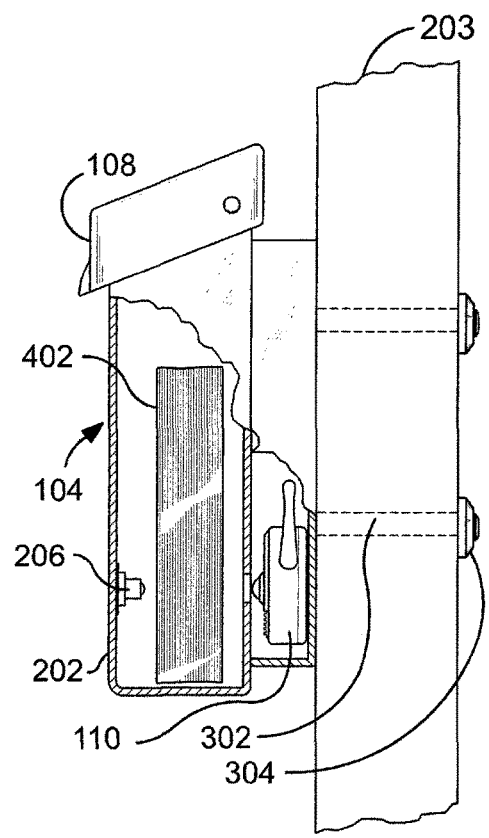
Figure 5:
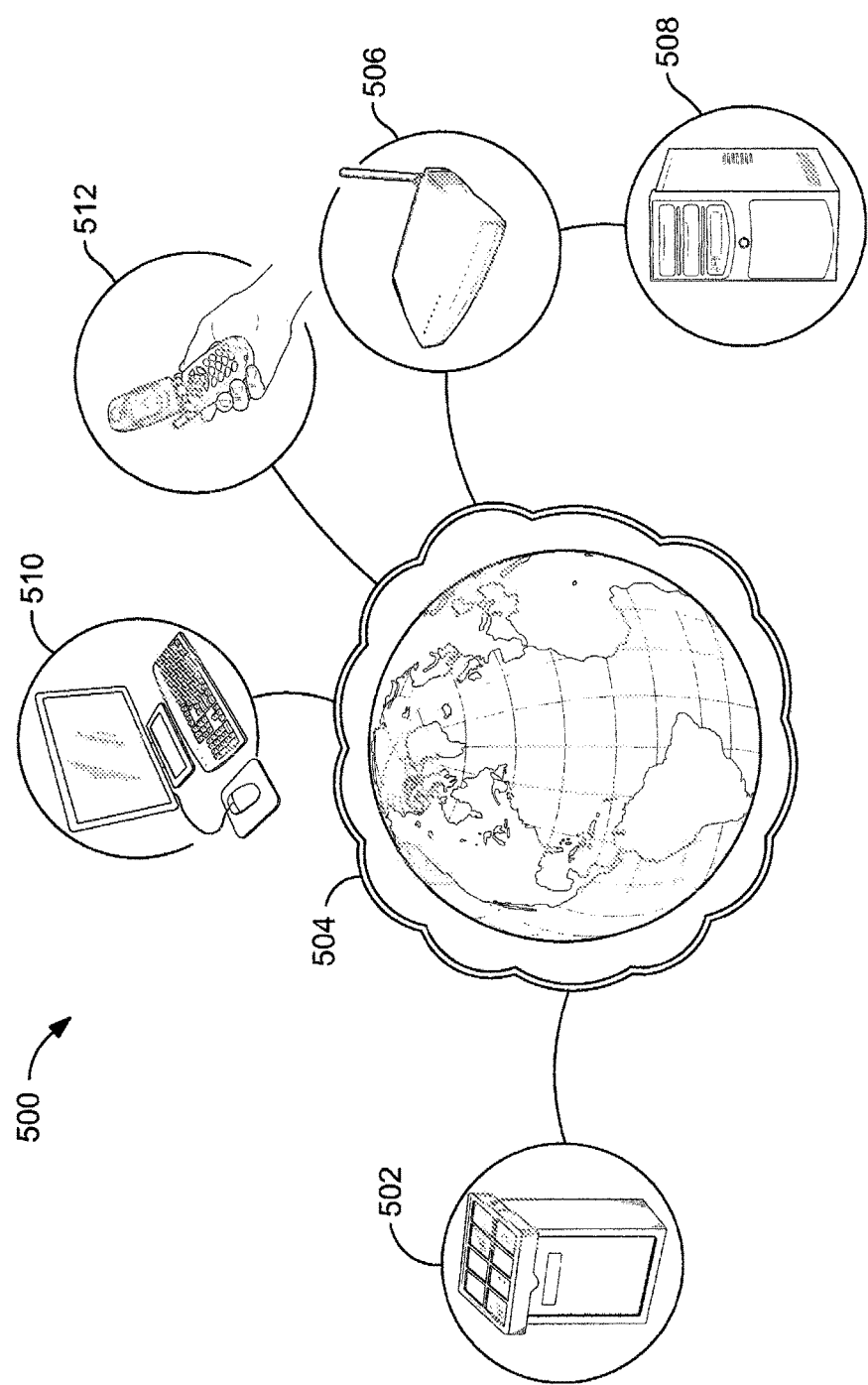
FIG. 5 is a diagram of a system for wirelessly monitoring a brochure box having a sensor, in accordance with an embodiment of the invention.

FIGS. 4a and 4b are side elevational views of a brochure box having a sensor fastened to a sign holder, in accordance with an embodiment of the invention. In one embodiment, system 200 includes the brochure box 104, the lid 108, the sensor node 110, the infrared light source 206, the at least one post 203, the lock 304, and the sign holder 102. FIG. 4a includes brochures 402 and FIG. 4b does not include brochures 402. As described more fully in reference to FIGS. 1-3 supra, the brochure box 104 includes the front panel 202, the lid 108, and the sensor node 110 and is fastened to the sign holder 102 using the at least one post 302 and the lock 304. The sensor node 110 includes an optical sensor, a processor, a wireless communication modem, and a power supply and is mounted within the brochure box 104 at a side opposite the front panel 202. The optical sensor is configurable to sense infrared light from the infrared light source 206, which is mounted opposite from the sensor node 110. When the brochure box 104 includes the brochures 402 contained therein (FIG. 4a), infrared light from the infrared light source 206 is blocked and does not reach the optical sensor. Oppositely, when the brochure box 104 is empty (FIG. 4b), infrared light from the infrared light source 206 is not blocked and reaches the optical sensor of the sensor node 110. Thus, to determine when the brochures 402 are exhausted, the infrared light source 206 transmits infrared light toward the optical sensor. When the brochures 402 are exhausted, the infrared light reaches and is sensed by the optical sensor. The processor then instructs the wireless communication modem to transmit a signal containing a unique identifier to a base station (FIG. 5). An entity is then notifiable via text message, email, mail, phone, internet, pager, or otherwise that the sensor node 110 in the brochure box 104 corresponding to the unique identifier has sent a signal, which indicates that the brochures within the brochure box 104 are exhausted. In one particular embodiment, the frequency for which the infrared light source 206 transmits infrared light or for which the optical sensor senses for infrared light is adjustable. For example, in high traffic areas the brochures 402 can be exhausted relatively quickly making increased frequencies important, whereas in low traffic rural areas the brochures 402 can be exhausted relatively slowly making decreased frequencies desirable.

In embodiments where the sensor node 110 samples ambient light levels, the threshold value or range of values can be adjustable to compensate for increased or decreased intensity of light entering the front panel 202. For example, during summer months or sunny days the sampled ambient light levels can be expected to be higher making higher threshold or range of values desirable to prevent false alarms. Oppositely, during winter months or cloudy days the sampled ambient light levels can be expected to be lower making lower threshold or range of values desirable to ensure prompt notice of exhausted brochures is provided. In one particular embodiment, a second ambient light sensor is configured to sample ambient light levels outside the brochure box 104 and the threshold or range of values are automatically adjusted accordingly. In yet a further embodiment, ambient light levels are successively sampled to prevent false alarms. For example, a first sampled ambient light level could be high despite the presence of the brochures 402 because the lid 108 was open. A subsequent sampled ambient light level would be low once the lid 108 was closed. Thus, successive sampling may reveal that the brochures 402 do not need replenishment. In yet another particular embodiment, a position or displacement sensor is used to determine whether the lid 108 is open when the sensor node 110 samples the ambient light levels.

The embodiments discussed herein are usable where the brochure box 104 is a mail box, post office box, a drop box, vending machine, or other receptacle in order to notify an entity that a document, mail, package, or other object is available for pickup. When the brochure box 104 is empty, light from the infrared light source 206 is not blocked and reaches the optical sensor of the sensor node 110. However, when the brochure box 104 contains an object, light from the infrared light source 206 is blocked and does not reach the optical sensor of the sensor node 110. Thus, to determine when an object is present within the brochure box 104, the infrared light source 206 transmits infrared light toward the optical sensor. When an object is present, the infrared light is blocked and does not reach the optical sensor. Upon the absence of infrared light, the processor then instructs the wireless communication modem to transmit a signal containing a unique identifier to a base station (FIG. 5). An entity is then notifiable via text message, email, mail, phone, internet, pager, or otherwise that the sensor node 110 in the brochure box 104 corresponding to the unique identifier has sent a signal, which indicates that an object is present within the brochure box 104 and is available for pickup.

In other embodiments, the sensor node 110 of the brochure box 104 can sense any of ambient light, other light, displacement, pressure, heat, movement, impression, position, weight, density, mass, magnetic flux, or a combination of the same or can be replaced or supplemented with an input device such as a mechanical or electrical button, switch, motion sensor, or other similar device.

FIG. 5 is a diagram of a system for wirelessly monitoring a brochure box having a sensor, in accordance with an embodiment of the invention. In one embodiment, system 500 includes a brochure box 502, a network communications cloud 504, a base station 506, an application server 508, a computer 510, and a personal digital assistant 512. As discussed further in reference to embodiments herein, the brochure box 502 includes a sensor node, which is configurable to sense infrared light, ambient light, other light, displacement, pressure, heat, movement, impression, position, weight, density, mass, magnetic flux, user input, or a combination of the same to determine whether brochures contained therein are low, exhausted, or whether objects are present. Upon a determination that the brochures need replenishment, or that documents, mail, packages, or other objects are present as the case may be, the sensor node sends a wireless signal containing a unique identifier for the brochure box 502 through the network communication cloud 504 to the base station 506, which includes a processor component and a network communication component. The network communication component receives the wireless signal containing the unique identifier and the processor component forwards the signal to the application server 508 also using the network communication component. The application server 508 hosts a software application, which is available via the network communication cloud 504 to the computer 510 or the personal digital assistant 512. An entity using the computer 510 or the personal digital assistant 512 has an account on the software application that is associated with the unique identifier. Upon receipt of the signal containing the unique identifier from the base station 506, the software application of application server 508 sends or makes available a notification to the entity having the account that is associated with the unique identifier. The notification can be sent or made available through the network communication cloud 504 to the personal digital assistant 512 or the computer 510. Accordingly, an entity is configurable to fasten the brochure box 502 to a sign holder and deposit brochures therein (FIG. 1); alternatively, the brochure box 502 may be a receptacle for an object. The unique identifier for the brochure box 502 is then associated with the entity's account in the software application of the application server 508. When the application server 508 receives a signal from the brochure box 502, the software application uses the received unique identifier to retrieve the entity's account to notify the entity through the network communication cloud 504 that the brochure box 502 needs replenishment or has an object available for pickup. Until such notice, the entity confidently assumes that the brochure box 502 contains brochures or does not have an object available for pickup. In certain embodiments, the software application of the application server 508 stores and makes available data and statistics relating to the number and rate of brochures being removed from the brochure box 502 or the number and rate of objects being disposed within the brochure box 502. In one particular embodiment, any individual or entity can supply an identifier to the software application, such as via text message, to obtain information on a home or commercial building for sale and/or receive ongoing data relating to the home or commercial building. In a further embodiment, the software application of the application server 508 is configurable to accept contact information, such as an email account, from the entity. The software application of the application server 508 then forwards a questionnaire or a link to a questionnaire using the contact information, such as to the email account. The questionnaire is then answerable with the results being available to the entity. Accordingly, a listing agent can provide the software application of the application server 508 with an email account for a buyer's agent that previewed a home. The software application of the application server 508 then forwards a questionnaire to the buyer's agent for completion with the results being available to the listing agent. The questionnaire can include questions such as (1) did you preview the home by yourself or did you bring your clients with you; (2) what did you like or dislike about the home; (3) what do you believe the home to be worth?

In certain embodiments, the unique identifier is associated with an entity's account by the entity accessing the software application of the application server 508 and establishing such association. Alternatively, the brochure box 502 is configurable to manually, electronically, or wirelessly receive an entity's account information. The brochure box 502 then forwards the received account information and the unique identifier to the software application of the application server 508 whereby the software application associates the unique identifier with the received account information for the entity. In yet another particular embodiment, the software application of the application server 508 transmits the notification through the network communication cloud 504 to the personal digital assistant 512 or the computer 510. In an alternative embodiment, the entity accesses the software application of the application server 508 to review the notification, such as by using the personal digital assistant 512, the computer 510, or via another means. In a further embodiment, the brochure box 502 sends a signal directly to an entity, such as via text message or other electronic communication, thereby directly notifying the entity that brochures are low or exhausted or that objects are present.

In yet another embodiment, the base station 506 is disposed near the brochure box 502, such as in a home that is being advertised for sale using the brochure box 502 or within a post office location; although, the base station 506 may be disposed at any location. The base station 506 is communicatably linked to the application server 508 using an internet or local area connection, such as the home or post office location's internet connection or local area connection. Accordingly, in one particular embodiment, the sensor node sends a wireless signal containing a unique identifier for the brochure box 502 to the base station 506 located in a nearby home or post office location and the base station 506 forwards the signal to the application server 508 using the home or post office location internet connection.

Figure 6:
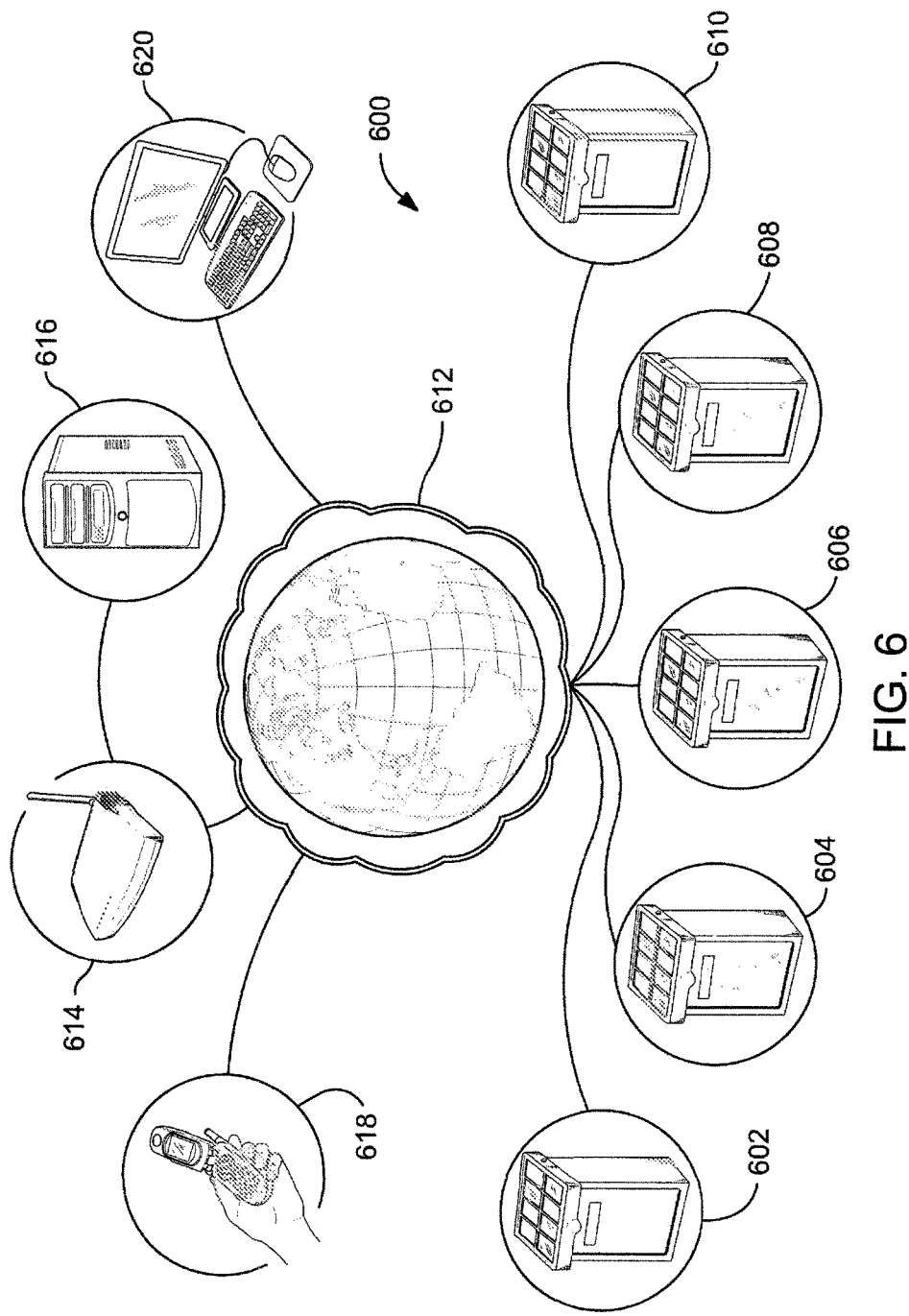
FIG. 6 is a diagram of a system for wirelessly monitoring a plurality of brochure boxes having sensors, in accordance with an embodiment of the invention.

FIG. 6 is a diagram of a system for wirelessly monitoring a plurality of brochure boxes having sensors, in accordance with an embodiment of the invention. In one embodiment, system 600 includes a plurality of brochure boxes 602-610, a network communication cloud 612, a base station 614, an application server 616, a personal digital assistant 618, and a computer 620. System 600 operates as described in reference to FIG. 5 supra with the exception that system 600 includes the plurality of brochure boxes 602-610, each of which include a different unique identifier. Thus, brochures can be supplied to the brochure boxes 602-610, which are disposed in different geographic locations. The unique identifiers of the brochure boxes 602-610 are then associated with an entity's account on a software application hosted by the application server 616. Each of the brochure boxes 602-610 sense whether the brochures contained therein are low or exhausted. When one of the brochure boxes 602-610 has brochures that are low or exhausted, it sends a signal containing its unique identifier to the software application of the application server 616. The software application of the application server 616 then notifies the entity having the account associated with the unique identifier that the brochure box associated with the unique identifier needs replenishment. Accordingly, an entity is able to remotely monitor the plurality of brochure boxes 602-610 despite their different geographic locations. Additionally, when the brochure boxes 602-610 are a post office box, a mail box, a drop box, or a vending machine, the unique identifiers of the brochure boxes 602-610 can be associated with an account on a software application hosted by the application server 616. Each of the brochure boxes 602-610 sense or receive input on whether documents, mail, packages, or other objects are present. When one of the brochure boxes 602-610 has documents, mail, packages, or other objects available for pick-up, it sends a signal containing its unique identifier to the software application of the application server 616. The software application of the application server 616 obtains the account associated with the unique identifier and notifies the entity associated therewith that the brochure box associated with the unique identifier has a document, mail, package, or other objects available for pick-up. In one particular embodiment, the brochure boxes 602-610 can include a combination of brochure boxes that sense the absence or presence of brochures or objects.

Figure 7:
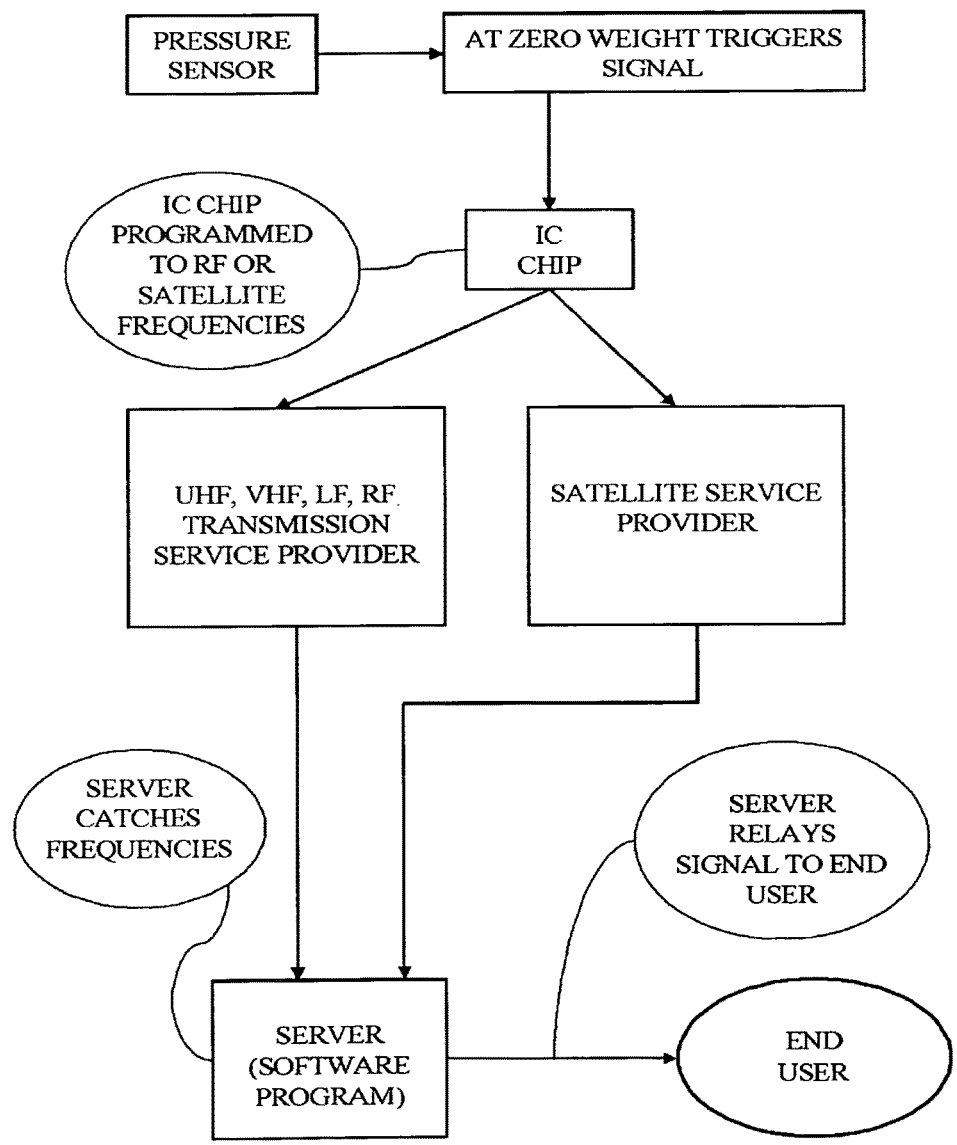
FIG. 7 illustrates use of a weight sensor, according to embodiments of the invention.

FIG. 7 is a diagram of a system for wirelessly monitoring a brochure box having a sensor, in accordance with an embodiment of the invention. A brochure box contains a pressure or weight sensor. When the pressure or weight sensor indicates that there is zero weight or pressure, or some other threshold amount of weight or pressure, a computer chip sends an (radio frequency) RF, (low frequency) LF, (very high frequency) VHF, or (ultra high frequency) UHF or a satellite signal to a service provider that indicates that brochures within the brochure box need replenishment. The transmission is received by a server and relayed to an end user. The end user can then take appropriate action to replenish the brochures within the brochure box.

Figure 8A:
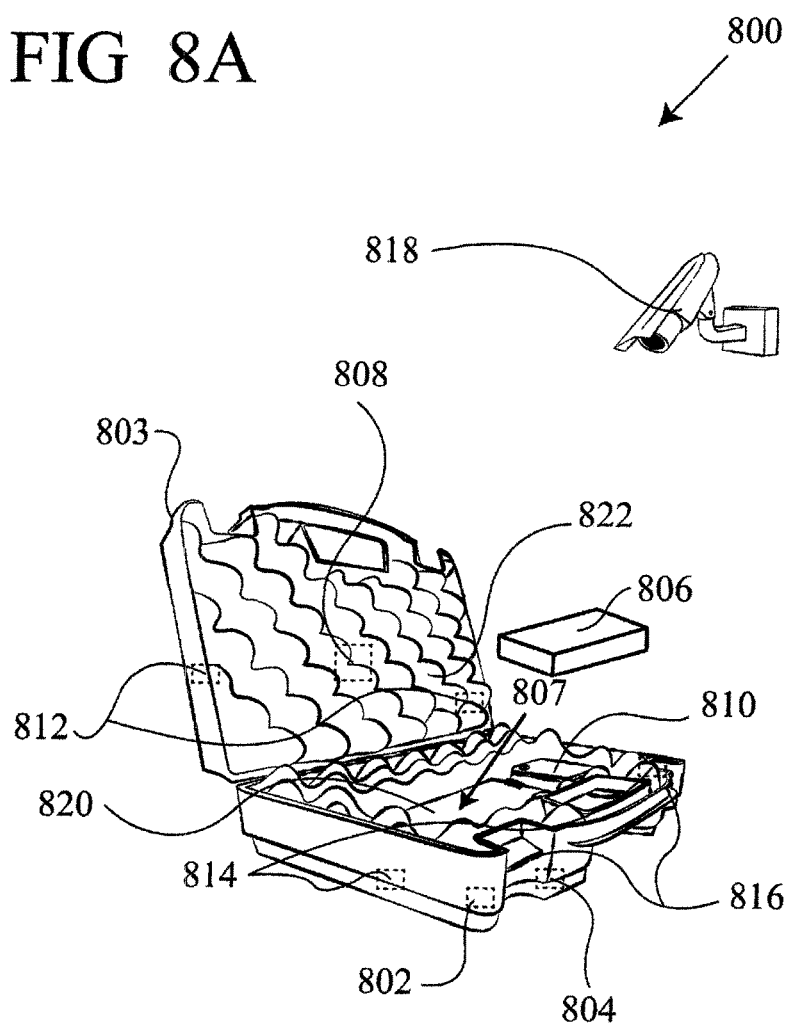
FIG. 8A illustrates a perspective view of a receptacle for monitoring a removable object, according to embodiments of the invention.
Figure 8B:
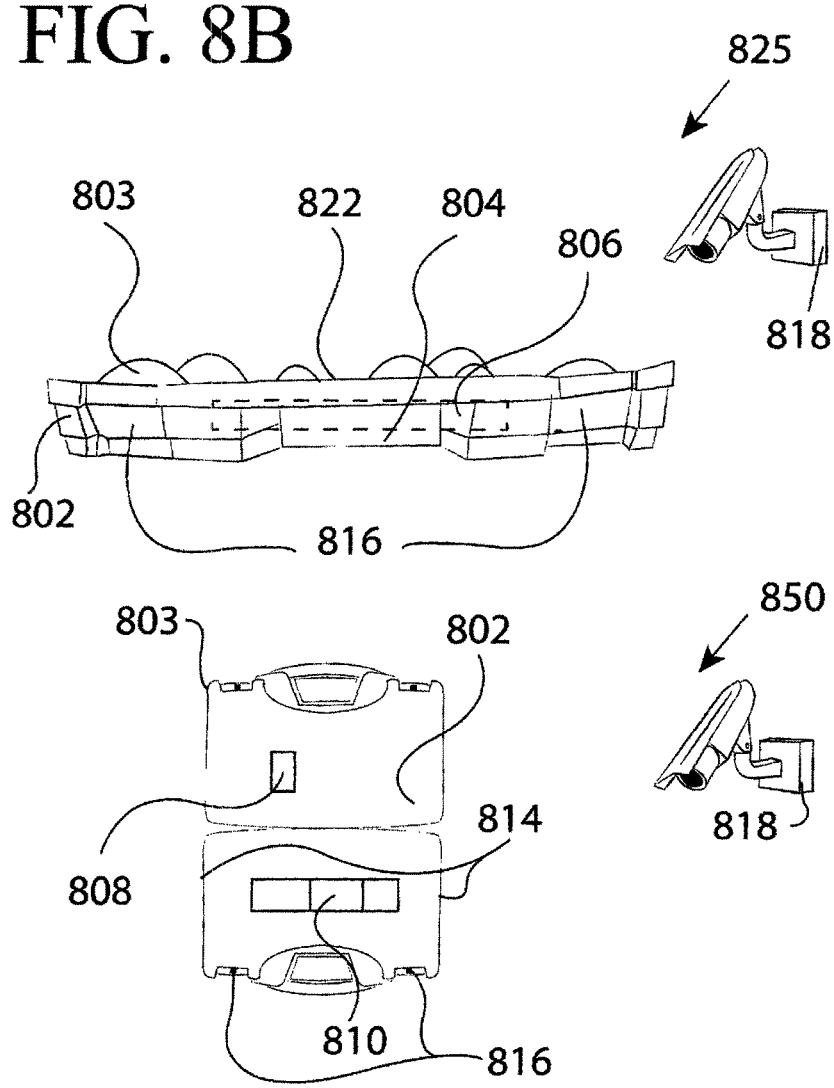
FIG. 8B illustrates front and side views corresponding with FIG. 8A. according to embodiments of the invention.

FIG. 8A illustrates, generally at 800, a perspective view of a receptacle for monitoring a removable object, according to embodiments of the invention. With reference to FIG. 8A, a receptacle 802 has a lid 803, and defines a cavity 820. In various embodiments, a front panel 804 contains locks 816 which are used to secure the lid 803 to the receptacle 802. Note that locks 816 can be arranged in other locations on the receptacle 802 and in some embodiments locks are optional. The lid 803 is movable between an open position as is shown in FIG. 8A and a closed position as is shown in FIG. 8B in 825. Within the cavity 820 of the receptacle 802 a removable object 806 is placed therein by moving into position as shown by an arrow 807. In some embodiments, functionality from an external camera 918 is integrated into a receptacle for a removable object. In accordance with the teaching in the preceding paragraphs above, the receptacle can be any receptacle used to contain a removable object. In various embodiments, the receptacle is a safe, a gun case or a gun holster and the removable object is a gun or ammunition for a gun. It will be understood that the terms receptacle and gun case or gun holster will be used interchangeably throughout this description of embodiments and as well, the terms object, removable object, and gun or ammunition will be used interchangeably throughout this description of embodiments.

A sensor node 810 is used in conjunction with the receptacle 802 to monitor the receptacle 802 and/or the presence or absence of the removable object 806. In various embodiments, the sensor node 810 can be configured with one or more sensors that are used to monitor the presence of a removable object. In some embodiments, a plurality of sensor nodes is disposed within a receptacle. As described above in conjunction with the preceding figures, in various embodiments, the sensor node 810 is configured with one or more sensors, a processor, a wireless communications modem (e.g. communications component), and a power source. In operation, placement of the removable object 806 into the cavity 820 and closure of the lid 803 engages the system. If the removable object is removed by an unauthorized user, the sensor node 110 transmits a signal to a remote device. In various embodiments, the sensor(s) and sensor node(s) provide information if a receptacle is moved. The signal contains a unique identifier that is associated with the receptacle 802. The signal also provides information from the one or more sensors that are associated with a receptacle. The wireless communications modem uses cellular, satellite, wireless local area network (LAN) or other similar technology to send the communication signal. Through the process described above, in conjunction with preceding FIG. 1 through FIG. 7, the entity responsible for the receptacle 802 is notified of the status of the receptacle and removable object. Such notification can include removable object present, removable object not present, receptacle lid open, receptacle lid closed, receptacle being moved, etc. Optionally, identifying information related to the gun can be transmitted via the signal, such that a serial number or other unique identifier information can be transmitted according to a predefined notification protocol. In alternative embodiments, the signal can be transmitted via a wired path from the receptacle to the communications network. In yet other embodiments, the sensor node is wired directly to the applications server. Note that in some embodiments a receptacle is configured to send a notification directly to an entity without an separate application server. In the various embodiments, a receptacle can be configured for one-way communication or bi-directional communication with an entity directly or through an application server.

In various embodiments, the receptacle 802 is optionally configured with lights 812 and speakers 814. In some embodiments, lights 812 are made using light emitting diode technology. Lights 812 provide illumination for the receptacle 802 and its contents. Alternatively, or in addition to providing illumination, lights 812 can provide a visual status indicator. For example, in some embodiments, illumination of lights 812 coincides with indication of intrusion into the receptacle 802.

In some embodiments, speakers 812 are used to provide an audible customized message pertaining to the status of the receptacle 802 and the removable object 806. A customized message can be "lid open," "close the lid," "gun missing," etc.

In some embodiments, a solar panel 822 provides power or recharges an internal power source such as a battery.

In various embodiments, the sensor node 810 can be configured with different combinations of sensors. For example, the sensor node can include a sensor to monitor the removable object 806 and a sensor to provide details on the removable object 806 or details on the receptacle 802. For example, in some embodiments, an RFID reader is included with the sensor node 110. An RFID reader can be used to read an RFID tag on the removable object 806. Such information can be used to assist in the recovery of a removable object that should not have been removed from its receptacle. In some embodiments, a global position system (GPS) is included with the receptacle. The GPS system is used to provide a location of the receptacle. Location information can be included with the signal that the sensor node transmits to the remote device for notification to an entity. For example, if the receptacle is moved in conjunction with a theft, the processor can determine the occurrence of the move by comparing a past position of the receptacle with a present position. Alternatively, a sensor node includes an accelerometer which is used to detect motion and/or movement of the receptacle and/or removable object. Following the determination that a move occurred, the processor is configured to instruct the wireless communication component (modem) to send a communications signal to a base station, such as a remote device/application server, indicating a possible theft of the receptacle and the removable object contained therein. Alternatively, the sensor node can be configured to send a notification signal directly to an entity associated with the receptacle and/or the removable object, thereby eliminating the need for an external applications server.

In one embodiment, the sensor is an infrared light sensor which is configured to sense infrared light emitted from an infrared light source such as 808. In some embodiments, the infrared light source is positioned so that when the removable object 806 is placed into the cavity 820 a path of light from 808 to 810 is obstructed. Thus, when the removable object 806 is removed from the cavity the light path is complete; light is then received at the sensor node 810 from the infrared light source 808. In such a case, the processor is configured to cause the communications component (e.g., modem, etc.) to transmit a signal as previously described. In another embodiment, the infrared light source 808 is located proximate to the sensor node 810 such that infrared light is scattered from the removable object 806 when the removable object 806 is located in the cavity 820 (indicating the gun present state). Scattered infrared light is received by the sensor node 810 in this condition. If the removable object 806 is removed from the receptacle 802 then the infrared light is not scattered back to the sensor node, this indicates the gun not present state. Note that the processor can be programmed according to various logic states concerning whether or not infrared light is received by the infrared light sensor or not.

In various embodiments, the sensor node 810 is configurable to sample any of ambient light, other light, displacement, pressure, heat, movement, impression, position, weight, density, mass, magnetic flux, another attribute, a user defined parameter or a combination of the same. For instance, in one particular embodiment, the sensor node 810 is configurable to sample ambient light levels in the receptacle 802 and the processor compares the sampled ambient light levels with a predetermined threshold value or range of values. When the sampled ambient light levels are greater than the predetermined threshold value or outside a range of values, such as would occur when the removable object 806 is not in the receptacle 802, the processor instructs the wireless communication modem to send a communication signal containing a unique identifier to a base station such as described above in conjunction with FIG. 5 or below in conjunction with FIG. 12. An entity can then be notified via text message, email, mail, phone, Internet, pager, or otherwise that the sensor node 810 corresponding to the unique identifier has sent a signal, regarding the receptacle 802 and the removable object 806.

In another embodiment, the sensor node 810 is configurable to sample the weight of a removable object 806 within the receptacle 802, such as using a pressure plate or pressure resistant coils. The processor compares the sampled weight values with a predetermined threshold value or range of values. When the weight is below the threshold value or outside the minimum and maximum weight distribution values, indicating the absence of the removable object, the processor instructs the wireless communication modem (component) to send a communication signal containing a unique identifier to a base station (described in FIG. 5 or FIG. 12). In one embodiment, when the weight is greater than the maximum weight distribution value, the processor instructs the wireless communication modem to send a communication signal to a base station indicating that there is tampering or some other problem at the receptacle. Similarly, the sensor node 810 can be configurable to sample displacement or position and the processor compares the sampled displacement or position value with the predetermined threshold value or the range of values. Similarly, the sensor node 810 can be configured to sample movement, impression, density, mass, magnetic flux, or a combination of any of the above, comparison against threshold values provides the processor with the information needed to ascertain the status of the removable object and or the receptacle. In yet a further embodiment, the sensor node 810 is supplemented or replaced by an input device such as an electronic or mechanical button, switch, audible sensor, motion sensor, or other similar device. Indeed, the sensor node 810 can include any sensor or input, device to provide information to the processor about the presence or absence of the removable object 806.

FIG. 8B illustrates front and side views corresponding with FIG. 8A according to embodiments of the invention. With reference to FIG. 8B, a front view of the receptacle 802 is shown generally at 825. The removable device 806 is indicated by dashed lines within the cavity of the receptacle 802. An open top view of the receptacle 802 is shown generally at 850 with the lid 803 in an open position.

Figure 9:
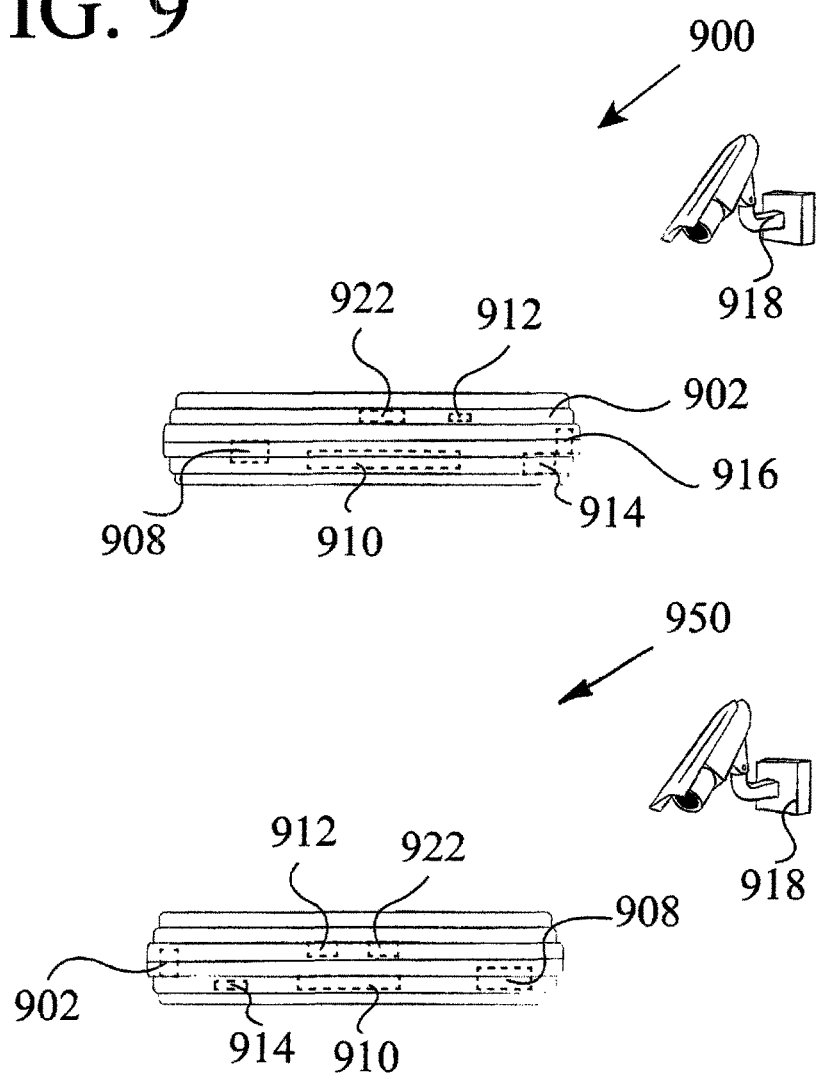
FIG. 9 shows side views of a receptacle for monitoring a removable object according to embodiments of the invention.

FIG. 9 shows side views of a receptacle for monitoring a removable object according to embodiments of the invention. With reference to FIG. 9, a first side view is shown generally at 900 and the opposite side view is shown generally at 950. A receptacle 902 for a removable object (not shown) has a sensor node 910 and optionally an infrared light source 908. As described above in conjunction with the preceding figures, the receptacle 902 can have one or more speakers 914 and one or more lights 912. An optional solar panel is shown at 922. Functionality from an optional camera 918 can be incorporated into a receptacle in some embodiments. Optional locks 916 can be used in some embodiments.

Figure 10A:
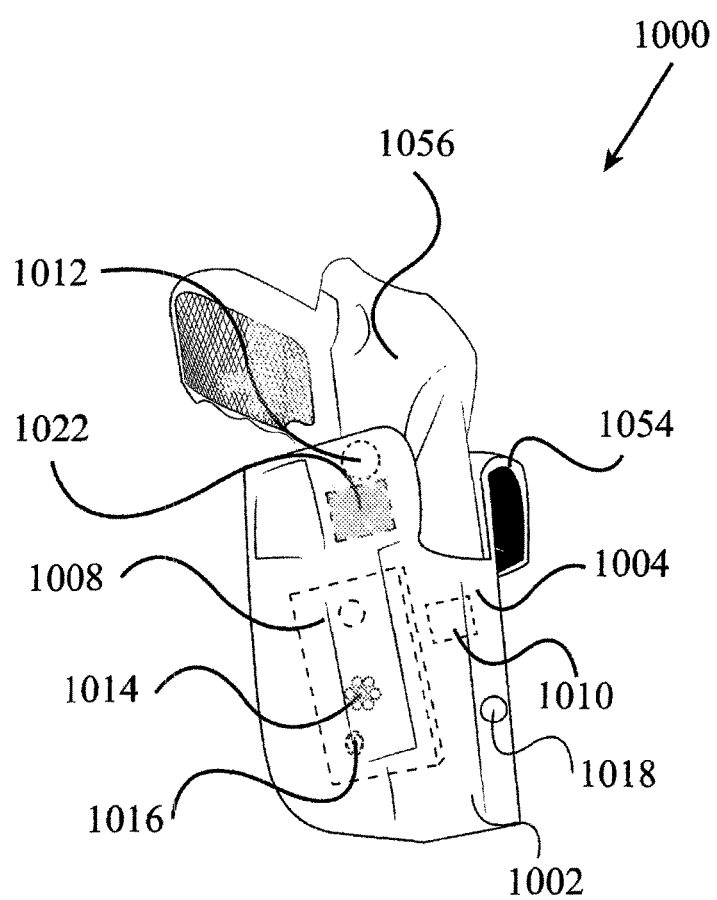
FIG. 10A illustrates a perspective view of a removable object and a receptacle.

FIG. 10A illustrates, generally at 1000, a perspective view of a removable object and a receptacle. With reference to FIG. 10A, a receptacle (holster) 1002 forms a cavity to receive a removable object 1056 (gun). The receptacle 1002 has a front panel 1004 and is configured with a loop to receive a belt (not shown). As described above in conjunction with the previous figures, the receptacle 1002 is configured with a sensor node 1010. Optionally, in various embodiments, the receptacle 1002 is configured with a built-in camera 1018.

In various embodiments, the receptacle 1002 is configured with speakers 1014, lights 1012, and a solar panel 1022. In some embodiments, a lock 1016 is provided to lock the removable object (gun) 1056 into the receptacle 1002. As described above in the preceding figures in various embodiments, a receptacle 1002 can be fitted with a source of infrared light 1008 to work in conjunction with the sensor node 1010, thereby providing a processor with the inputs necessary to determine whether the removable object is inserted into the receptacle or not. Also, as described above, another type of sensor can be used within the sensor node 1010 to provide this functionality.

Figure 10B:
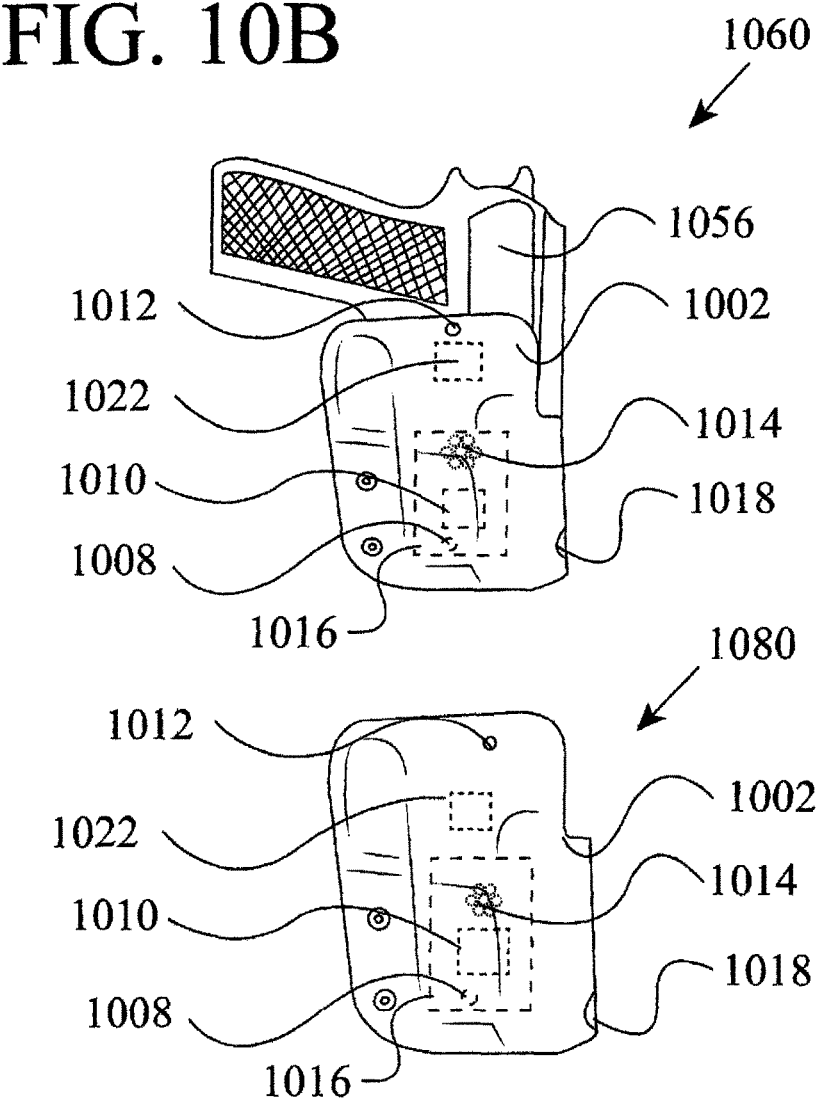
FIG. 10B illustrates side views corresponding with FIG. 10A according to embodiments of the invention.

FIG. 10B illustrates side views corresponding with FIG. 10A according to embodiments of the invention. With reference to FIG. 10B, at 1060 the removable object 1056 is shown inserted into the receptacle 1002. In this position the sensor node 1010 is configured to provide a signal to the wireless communications component that the removable object is resident within the cavity of the receptacle. If either the receptacle 1008 or the sensor node contains an infrared light sensor then light radiated from the infrared light source 1008 is used to determine whether the removable object is present or not. At 1080 the removable object has been removed from the receptacle. In this condition, after the processor has determined that the removable object is not present a message is sent from the wireless communications component (e.g. modem, etc.) to notify the remote device and the applications server of this change in status.

Figure 11:
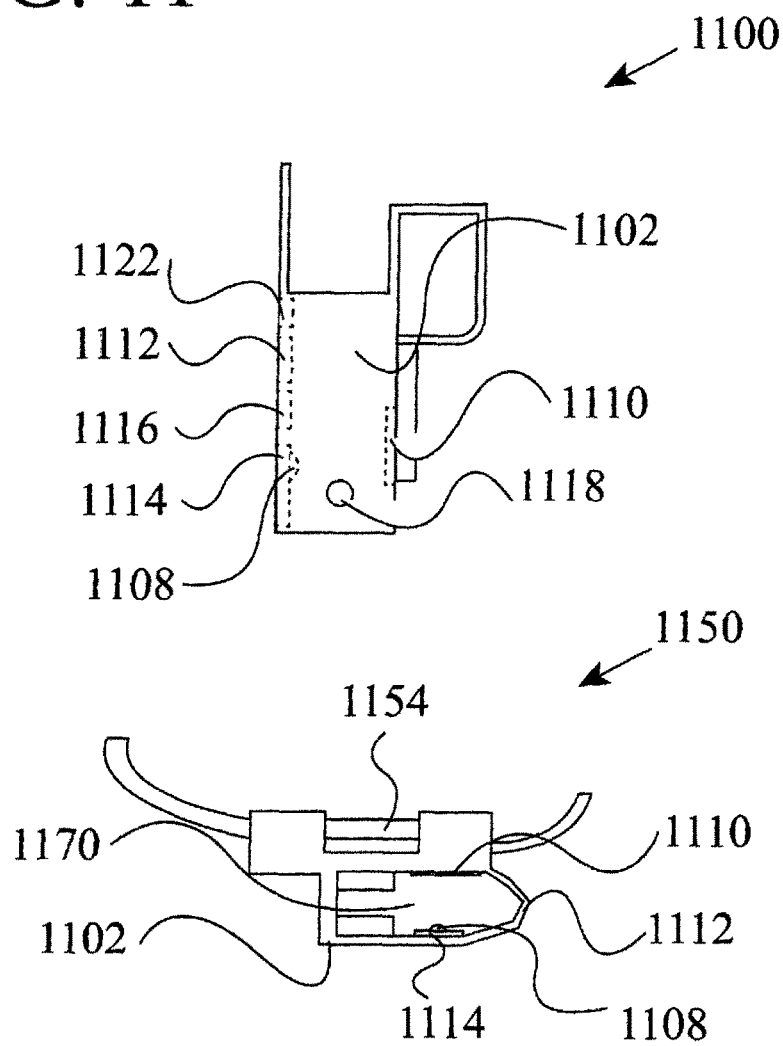
FIG. 11 illustrates a side and top view of another receptacle for a removable object according to embodiments of the invention.

FIG. 11 illustrates a side and top view of another receptacle for a removable object according to embodiments of the invention. With reference to FIG. 11, a side view is shown at 1100. A receptacle 1102 (gun holster) is shown without the removable device (gun) inserted for clarity of illustration. As described above in conjunction with the previous figures, the receptacle 1102 contains a sensor node 1110. Optional components can include a built-in camera 1118, a source of infrared light 1108, a speaker(s) 1114, a lock 1116, a light 1112, and a solar panel 1122.

With reference to FIG. 11 a top view is shown at 1150. The holster 1102 (receptacle) is shown positioned on a belt 1154. Such a configuration enables a user of the system to wear the receptacle 1102 on a belt.

Figure 12:
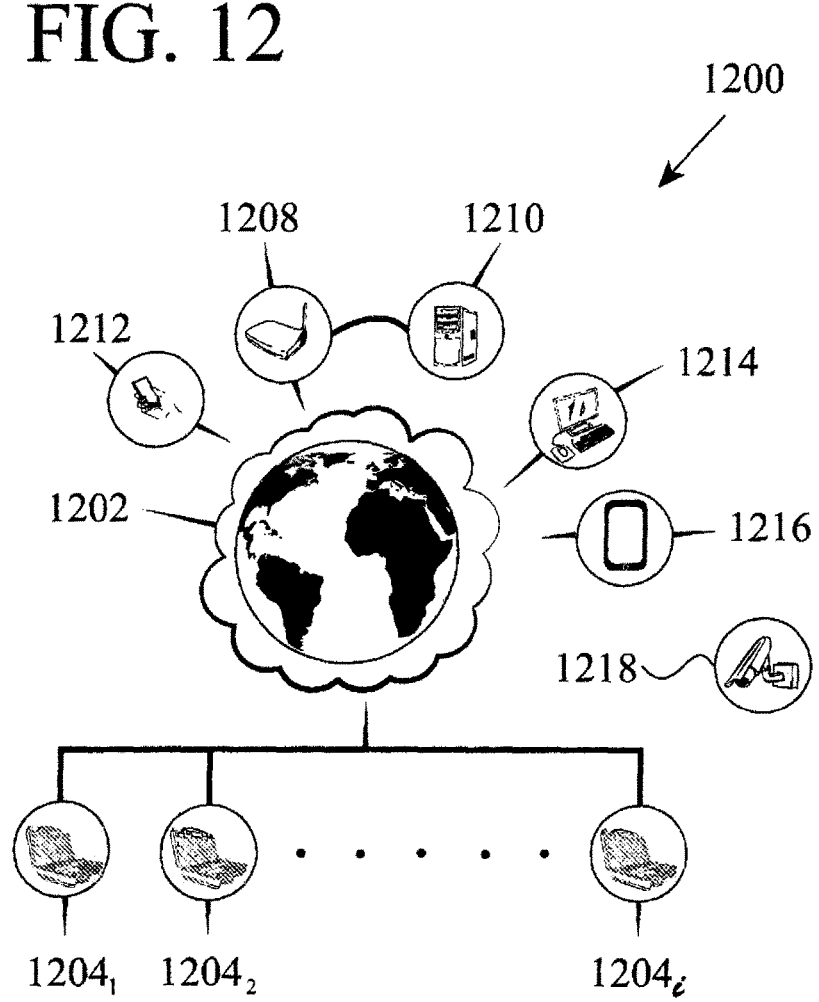
FIG. 12 is a diagram of a system for wirelessly monitoring a receptacle and removable objects according to embodiments of the invention.

FIG. 12 is a diagram of a system, generally at 1200, for wirelessly monitoring a receptacle and removable object according to embodiments of the invention. In various embodiments, a system 1200 includes one or more receptacles $1204_1$, $1204_i$ (where i represents a general number of receptacles), a network communications cloud 1202, a remote device or base station 1208, an application server 1210, a computer 1214, a tablet computer 1216, and a personal digital assistant 1212. As discussed further in reference to embodiments herein, each of the receptacles $1204_1$-$1204_i$ includes a sensor node, which is configurable to sense one of infrared light, ambient light, other light, displacement, pressure, heat, movement, impression, position, weight, density, mass, magnetic flux, a user defined parameter, or a combination of the same to determine whether removable objects are present, such as a gun within a gun case.

Upon a determination that a removable object(s) is present or not present, as the case may be, the sensor node sends a wireless signal containing a unique identifier for the receptacle through the network communication cloud 1202 to the base station 1208, which includes a processor component and a network communication component. The network communication component receives the wireless signal containing the unique identifier and the processor component forwards the signal to the application server 1210 also using the network communication component. The application server 1210 hosts a software application, which is available via the network communication cloud 1202 to the computer 1214, tablet 1216, or the personal digital assistant 1212. The personal digital assistant can include voice functionality and is also referred to in the art as a mobile phone. An entity using the computer 1214 or the personal digital assistant 1212 has an account on the software application that is associated with the unique identifier.

Upon receipt of the signal containing the unique identifier from the base station 1208, the software application of application server 1210 sends or makes available a notification to the entity having the account that is associated with the unique identifier. The notification can be sent or made available through the network communication cloud 1202 to the personal digital assistant 1212, tablet 1216 or the computer 1214. The unique identifier for the receptacle $1204_j$ is then associated with the entity's account in the software application of the application server 1210. When the application server 1210 receives a signal from the receptacle $1204_j$, the software application uses the received unique identifier to retrieve the entity's account to notify the entity through the network communication cloud 1202 that there is an issue needing attention at the receptacle $1204_j$. Until such notice, the entity confidently assumes that the removable object (gun) stored in the receptacle $1204_j$ (gun case or holster) is secure.

In certain embodiments, the software application of the application server 1210 stores and makes available data and statistics relating to the number and rate of objects removed from receptacles or the number and rate of objects being disposed within the receptacles. In one embodiment, any individual or entity can supply an identifier to the software application, such as via text message, to obtain information on a receptacle that the person or entity is responsible for, thereby checking the status of a removable object contained therein. In a further embodiment, the software application of the application server 1210 is configurable to accept contact information, such as an email account, from the entity. The software application of the application server 1210 then forwards information or a link to an end user using contact information, such as to the email account. The information provided by end user including the results or answers to questions are available to the entity. Accordingly, an owner of the gun holster can provide the software application of the application server 1210 with an email account for an end user. The software application of the application server 1210 then forwards the information to the end user for completion with the results being available to the owner or third party individual or entity of the gun holster or gun case. The information can include questions such as: (1) what did the topography consist of when the gun or weapon was deployed; (2) how many people were present when the gun or weapon was deployed; (3) what event motivated you to deploy the weapon or gun?; (4) was your gun stolen?, etc.

In certain embodiments, the unique identifier is associated with an entity's account by the entity accessing the software application of the application server 1210 and establishing such association. Alternatively, the receptacle is configurable to manually, electronically, or wirelessly receive an entity's account information. The receptacle then forwards the received account information and the unique identifier to the software application of the application server 1210 whereby the software application associates the unique identifier with the received account information for the entity.

In yet another embodiment, the software application of the application server 1210 transmits the notification through the network communication cloud 1202 to the personal digital assistant 1212, tablet 1216, or the computer 1214. In an alternative embodiment, the entity accesses the software application of the application server 1210 to review the notification, such as by using the personal digital assistant 1212, the tablet 1216, the computer 1214, or via another means. In a further embodiment, the receptacle sends a signal directly to an entity, such as via text message or other electronic communication, thereby directly notifying the entity that an object is present.

In yet another embodiment, the base station 1208 is disposed near the receptacle. However, the base station 1208 may be disposed at any location. The base station 1208 is linked to the application server 1210 using an internet or local area connection, such as a home business's internet connection or local area connection. Accordingly, in one particular embodiment, the sensor node sends a wireless signal containing a unique identifier for the receptacle to the base station 1208 located in a nearby home, post office, or police station, or security company location and the base station 1208 forwards the signal to the application server 1210 using an appropriate internet connection. In some embodiments the base station 1208 and the application server are configured together into one piece of hardware having the necessary functionality. In various embodiments, the sensor node is configured to communicate with the cellular telephone network. In such a case the signal is transmitted by connection to the cellular telephone network and then directed to the applications server.

In various embodiments, the notification functionality described above, with respect to the applications server, is provided directly by the receptacle. In such embodiments, an external applications server is not used and a notification(s) of an event happening at a receptacle is sent directly to the entity.

FIG. 13 illustrates, generally at 1300, a method for establishing a notification profile according to embodiments of the invention. With reference to FIG. 13, a process starts at a block 1302. At a block 1304 a plurality of notification elements are presented to an entity or to a party responsible for the gun case or gun holster. Some examples of notification elements are: (1) battery level, (2) display local light, (3) sound audible alarm, (4) notify the gun owner in the event that the gun case has been opened, (5) notify the gun owner in the event that the gun case is empty, (6) maintain a reminder that the gun is present in the gun case, (7) notify a security agency if a gun is not present, (8) notify a police department if a gun is not present, (9) transmit a serial number for a gun to a security company if a gun is not present in excess of a prescribed period of time, (10) notify a police department if a gun is not present in excess of a prescribed period of time.

An entity authorized to establish a notification profile selects one or more notification profile elements and these selections are received by the application program at a block 1306. At a block 1308 the selected notification profile elements are assigned to a notification profile that is associated with a particular gun case or gun holster. The process ends at a block 1310.

FIG. 14 illustrates, generally at 1400, a method for executing a notification profile according to embodiments of the invention. With reference to FIG. 14 a process starts at a block 1402. At a block 1404 a signal originates at a receptacle for a removable object and is transmitted to and is received by an application server. During the course of transmission to the application server the signal can traverse many and varied paths such as to and from communication satellites, routers, repeaters, etc. all of which are part of the cloud described above in conjunction with FIG. 5 and FIG. 12. The signal transmitted from the gun case or gun holster contains a unique identifier which is used at a block 1406 to retrieve a notification profile that is associated with the particular gun receptacle (gun case or gun holster).

At a block 1408 a notification is issued to an entity. The notification follows the notification profile retrieved at a block 1406. The notification can have one or more notification elements as described above in conjunction with FIG. 13. Note that as described above, in some embodiments, application server functionality is resident within a receptacle and an external application server is not required. In such embodiments, two-way or bi-directional communication functionality is provided within the receptacle to facilitate communication with an entity needed for establishing a notification protocol or for executing the notification protocol once established.

Thus, embodiments of the invention permit a greater degree of safety to be achieved with guns and ammunition by virtue of the speed with which a notification can be sent to an entity following an event at a gun case or gun holster. The responsible entity is notified and can take appropriate action to bring the gun or ammunition back into the entity's control. Accordingly, notification profiles can be established with heightened security wherein multiple notification paths are employed. For example, in the event of a monitoring event such as "gun not present" a notification profile can be established that notifies the gun owner and also notifies a local police office, security company, military unit, etc. according to a given deployment scenario for embodiments of the invention. In addition a security company can be notified of the "gun not present" event as well.

In some embodiments, a notification path proceeds to a subsequent step once a user takes an action during the first step of notification. For example, an event results in a notification being sent to a gun owner. The notification profile requires the gun owner to provide a handshake reply indicating the receptacle and/or gun is acceptable and that further progress along the notification profile is not needed. Alternatively, the handshake reply from the gun owner can indicate that a status of a receptacle and/or gun is not acceptable and that a further step along the notification profile is needed, such as for example notification of police, or other entity that will take action based on the notification.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus, comprising:
   a communications component;
   a sensor node, the sensor node further comprising:
      a first sensor, the first sensor is configured to monitor a status of a gun case; and
      a second sensor, the second sensor is configured to monitor a status of a removable object, wherein the removable object is contained within the gun case;
   a processor, the processor is in communication with the communications component, the processor is configured to notify an entity about the status of the gun case and the status of the removable object, wherein the gun case defines a closed volume and has a lid; and
   a computer readable medium containing executable computer program instructions, which when executed by the processor, cause the processor to perform a method comprising:
      receiving a signal, wherein the signal is generated by the sensor node in response to one of;
         a.) a change in the status of the removable object relative to the gun case;
         b.) a change in the status of the gun case; or
         c.) a change in the status of the gun case and a change in the status of the removable object, and the signal includes a unique identifier associated with at least one of the removable object and the gun case;
      retrieving a notification profile in response to the signal; and
      issuing at least one notification, wherein the at least one notification is sent to the entity and the at least one notification is obtained from the notification profile.

2. The apparatus of claim 1, wherein the entity is selected from the group consisting of a gun owner, a gun case owner, a security service, police, and a military unit.

3. The apparatus of claim 2, wherein the at least one notification is sent to the entity as a wireless communication.

4. The apparatus of claim 1, wherein the processor is configured with the sensor node to sense a presence of the removable object.

5. The apparatus of claim 1, further comprising:
   an application server, the application server performs the method.

6. The apparatus of claim 1, wherein the signal is generated by the sensor node in response to one of;

a.) a status of the removable object relative to the gun case;
b.) a status of the gun case; or
c.) a status of the gun case and a status of the removable object relative to the gun case, and the signal includes a unique identifier associated with at least one of the removable object and the gun case.

7. The apparatus of claim 1, wherein the signal is generated by the second sensor and the second sensor utilizes an RFID reader.

8. The apparatus of claim 7, wherein the removable object is selected from the group consisting of a gun and ammunition.

9. The apparatus of claim 1, wherein the gun case is a safe.

10. The apparatus of claim 7, further comprising:
a plurality of removable objects, wherein the signal is generated in response to either a status or a change in status of the plurality of removable objects, wherein each removable object of the plurality of removable objects has a unique identifier and the unique identifiers are associated with the status or the change in status of the plurality of removable objects.

11. The apparatus of claim 1, wherein the second sensor utilizes an infrared light source and an optical sensor.

12. An apparatus, comprising:
a communications component;
a sensor node, the sensor node further comprising:
 a first sensor, the first sensor is configured to monitor a status of a gun case; and
 a second sensor, the second sensor is configured to monitor separate statuses of at least two removable objects, wherein the at least two removable objects are contained within the gun case;
a processor, the processor is in communication with the communications component, the processor is configured to notify an entity about the status of the gun case and the statuses of the at least two removable objects; and
a computer readable medium containing executable computer program instructions, which when executed by the processor, cause the processor to perform a method comprising:
 receiving a signal, wherein the signal is generated by the sensor node in response to one of;
a.) statuses or changes in status of the at least two removable objects relative to the gun case;
b.) a status or a change in status of the gun case; or
c.) a status or a change in status of the gun case and statuses or changes in status of the at least two removable objects, and the signal includes unique identifiers associated with at least one of the at least two removable objects and the gun case;
retrieving a notification profile in response to the signal; and
issuing at least one notification, wherein the at least one notification is sent to the entity and the at least one notification is obtained from the notification profile.

13. The apparatus of claim 12, wherein the gun case defines a closed volume and has a lid and the first sensor generates a signal responsive to a position of the lid.

14. The apparatus of claim 13, therein the first sensor generates a signal responsive to motion of the gun case.

15. The apparatus of claim 14, wherein the first sensor utilizes an accelerometer.

16. The apparatus of claim 14, wherein the first sensor utilizes a GPS transceiver.

17. The apparatus of claim 12, wherein the second sensor utilizes an RFID reader to obtain separate status information on the at least two removable objects.

18. The apparatus of claim 17, wherein a first removable object of the at least two removable objects is a gun and a second removable object of the at least two removable objects is ammunition.

19. The apparatus of claim 12, wherein the gun case is a gun holster.

20. The apparatus of claim 19, wherein a first removable object of the at least two removable objects is a gun.

21. The apparatus of claim 20, wherein a second removable object of the at least two removable objects is ammunition.

22. The apparatus of claim 12, wherein the second sensor utilizes an infrared light source and an optical sensor.

23. The apparatus of claim 12, wherein the at least one notification sent to the entity as a wireless communication.

24. The apparatus of claim 23, wherein the wireless communication is a text message.

25. The apparatus of 23, wherein the wireless communication is an email message.

* * * * *